United States Patent
Pitts, III et al.

(10) Patent No.: US 7,437,295 B2
(45) Date of Patent: Oct. 14, 2008

(54) NATURAL LANGUAGE PROCESSING FOR A LOCATION-BASED SERVICES SYSTEM

(75) Inventors: Ashton F. Pitts, III, Redondo Beach, CA (US); Stephen L. Dempsen, Redondo Beach, CA (US); Vinny Wai-yan Che, Alhambra, CA (US)

(73) Assignee: Accenture LLP, San Jose, CA (US)

( * ) Notice: Subject to any disclaimer, the term of this patent is extended or adjusted under 35 U.S.C. 154(b) by 664 days.

(21) Appl. No.: 10/131,898

(22) Filed: Apr. 25, 2002

(65) Prior Publication Data

US 2002/0161587 A1   Oct. 31, 2002
US 2004/0243417 A9   Dec. 2, 2004

Related U.S. Application Data

(63) Continuation-in-part of application No. 09/946,111, filed on Sep. 4, 2001, now Pat. No. 6,944,447.

(60) Provisional application No. 60/286,916, filed on Apr. 27, 2001.

(51) Int. Cl.
G06F 17/20 (2006.01)

(52) U.S. Cl. ............... 704/275; 704/270; 704/270.1; 704/9

(58) Field of Classification Search ............... 704/270.1, 704/276, 9, 270, 275; 379/58; 364/900; 455/422.1
See application file for complete search history.

(56) References Cited

U.S. PATENT DOCUMENTS

| 4,586,160 A | * | 4/1986 | Amano et al. ................ 704/8 |
| 4,791,281 A | | 12/1988 | Johnsen et al. ............. 235/383 |
| 5,343,493 A | | 8/1994 | Karimullah .................. 375/1 |
| 5,559,707 A | | 9/1996 | DeLorme et al. ............ 346/443 |
| 5,625,668 A | | 4/1997 | Loomis et al. | |

(Continued)

FOREIGN PATENT DOCUMENTS

EP   0 837 406 A2   4/1998

(Continued)

OTHER PUBLICATIONS

"The Risks Digest," ACM Committee on Computers and Public Policy, Peter G. Neumann, moderator, vol. 21, Issue 5, Sep. 2000, http://catless.ncl.ac.uk/Risks/21.05.html.

(Continued)

*Primary Examiner*—Richemond Dorvil
*Assistant Examiner*—E. Yen
(74) *Attorney, Agent, or Firm*—Brinks Hofer Gilson & Lione

(57) ABSTRACT

A method and system for providing natural language processing in a communication system is disclosed. A voice request is generated with a remote terminal that is transmitted to a base station. A speech recognition application is then used to identify a plurality of words that are contained in the voice request. After the words are identified, a grammar associated with each word is also identified. Once the grammars have been identified, each word is categorized into a respective grammar category. A structured response is then generated to the voice request with a response generation application.

27 Claims, 4 Drawing Sheets

U.S. PATENT DOCUMENTS

| | | | |
|---|---|---|---|
| 5,682,525 A | 10/1997 | Bouve et al. ................. 395/615 |
| 5,717,923 A | 2/1998 | Dedrick |
| 5,764,731 A | 6/1998 | Yablon ........................ 379/216 |
| 5,774,860 A * | 6/1998 | Bayya et al. ................. 704/275 |
| 5,794,204 A * | 8/1998 | Miyazawa et al. .......... 704/275 |
| 5,794,235 A * | 8/1998 | Chess .............................. 707/5 |
| 5,804,803 A | 9/1998 | Cragun et al. ................ 235/375 |
| 5,809,471 A * | 9/1998 | Brodsky ....................... 704/275 |
| 5,860,063 A * | 1/1999 | Gorin et al. .................. 704/257 |
| 5,905,246 A | 5/1999 | Fajkowski .................... 235/375 |
| 5,924,070 A * | 7/1999 | Ittycheriah et al. .......... 704/275 |
| 5,963,940 A * | 10/1999 | Liddy et al. ...................... 707/5 |
| 6,049,711 A | 4/2000 | Ben-Yehezkel et al. ..... 455/414 |
| 6,073,112 A | 6/2000 | Geerlings ..................... 705/14 |
| 6,076,099 A | 6/2000 | Chen et al. |
| 6,091,956 A | 7/2000 | Hollenberg |
| 6,112,174 A * | 8/2000 | Wakisaka et al. ............ 704/257 |
| 6,125,342 A * | 9/2000 | Selesky ............................ 704/9 |
| 6,181,927 B1 | 1/2001 | Welling, Jr. et al. ......... 455/414 |
| 6,185,535 B1 * | 2/2001 | Hedin et al. ................. 704/270 |
| 6,195,641 B1 * | 2/2001 | Loring et al. ................ 704/275 |
| 6,199,099 B1 | 3/2001 | Gershman et al. |
| 6,202,023 B1 | 3/2001 | Hancock et al. ............. 701/201 |
| 6,219,696 B1 | 4/2001 | Wynblatt et al. ............ 709/218 |
| 6,233,559 B1 * | 5/2001 | Balakrishnan ............... 704/275 |
| 6,236,977 B1 | 5/2001 | Verba et al. .................... 705/10 |
| 6,243,684 B1 | 6/2001 | Stuart et al. .................. 704/275 |
| 6,246,672 B1 | 6/2001 | Lumelsky ..................... 370/310 |
| 6,250,557 B1 | 6/2001 | Forslund et al. ............. 235/492 |
| 6,301,480 B1 | 10/2001 | Kennedy, III et al. ....... 455/445 |
| 6,301,560 B1 * | 10/2001 | Masters ........................ 704/251 |
| 6,308,151 B1 * | 10/2001 | Smith ........................... 704/235 |
| 6,317,718 B1 | 11/2001 | Fano |
| 6,336,098 B1 | 1/2002 | Fortenberry et al. ........... 705/14 |
| 6,360,167 B1 | 3/2002 | Millington et al. .......... 701/211 |
| 6,370,514 B1 | 4/2002 | Messner |
| 6,408,307 B1 | 6/2002 | Semple et al. ............. 707/104.1 |
| 6,418,199 B1 * | 7/2002 | Perrone .................... 379/88.01 |
| 6,418,216 B1 | 7/2002 | Harrison et al. ......... 379/208.01 |
| 6,424,945 B1 * | 7/2002 | Sorsa ........................ 704/270.1 |
| 6,427,115 B1 | 7/2002 | Sekiyama ..................... 701/208 |
| 6,434,524 B1 * | 8/2002 | Weber ........................... 704/257 |
| 6,434,526 B1 * | 8/2002 | Cilurzo et al. ............ 704/270.1 |
| 6,452,498 B2 | 9/2002 | Stewart ..................... 340/573.1 |
| 6,460,036 B1 | 10/2002 | Herz .............................. 707/10 |
| 6,466,796 B1 | 10/2002 | Jacobson et al. ............. 455/456 |
| 6,466,899 B1 | 10/2002 | Yano et al. ...................... 704/1 |
| 6,493,671 B1 * | 12/2002 | Ladd et al. ................... 704/270 |
| 6,501,833 B2 * | 12/2002 | Phillips et al. ............ 379/88.07 |
| 6,502,076 B1 | 12/2002 | Smith ............................. 705/14 |
| 6,510,417 B1 * | 1/2003 | Woods et al. ................ 704/275 |
| 6,513,052 B1 | 1/2003 | Binder .......................... 707/204 |
| 6,535,743 B1 | 3/2003 | Kennedy, III et al. ....... 455/456 |
| 6,535,854 B2 * | 3/2003 | Buchner et al. .............. 704/275 |
| 6,560,456 B1 | 5/2003 | Lohtia et al. ................. 455/445 |
| 6,606,745 B2 | 8/2003 | Maggio .......................... 725/23 |
| 6,614,885 B2 | 9/2003 | Polcyn .................... 379/88.02 |
| 6,647,257 B2 | 11/2003 | Owensby ................... 455/414.1 |
| 6,757,544 B2 | 6/2004 | Rangarajan et al. ....... 455/456.1 |
| 6,760,426 B2 | 7/2004 | Sbisa et al. ............. 379/221.09 |
| 6,792,096 B2 | 9/2004 | Martin et al. ........... 379/218.01 |
| 6,834,195 B2 | 12/2004 | Brandenberg et al. |
| 6,848,542 B2 | 2/2005 | Gailey et al. ................... 186/35 |
| 6,850,766 B2 | 2/2005 | Lau et al. .................. 455/456.1 |
| 6,859,777 B2 * | 2/2005 | Krasle ...................... 704/270.1 |
| 6,898,571 B1 | 5/2005 | Val et al. |
| 6,901,366 B1 * | 5/2005 | Kuhn et al. .................. 704/275 |
| 6,907,119 B2 | 6/2005 | Case et al. ............. 379/218.01 |
| 6,937,986 B2 * | 8/2005 | Denenberg et al. .......... 704/275 |
| 6,937,995 B1 | 8/2005 | Kepecs .......................... 705/14 |
| 6,944,447 B2 | 9/2005 | Portman et al. .......... 455/422.1 |
| 6,961,706 B2 | 11/2005 | Saito .......................... 704/275 |
| 6,970,830 B1 | 11/2005 | Samra et al. .................. 705/10 |
| 6,996,531 B2 | 2/2006 | Korall et al. ................ 704/270 |
| 7,006,983 B1 | 2/2006 | Packes, Jr. et al. ............ 705/14 |
| 7,020,609 B2 * | 3/2006 | Thrift et al. .............. 704/270.1 |
| 7,028,072 B1 | 4/2006 | Kliger et al. ................. 709/203 |
| 7,050,977 B1 * | 5/2006 | Bennett .................... 704/270.1 |
| 7,130,630 B1 | 10/2006 | Enzmann et al. ......... 455/435.1 |
| 7,233,655 B2 | 6/2007 | Gailey et al. ............ 379/210.01 |
| 7,254,384 B2 | 8/2007 | Gailey et al. ................. 455/412 |
| 2001/0044309 A1 | 11/2001 | Bar et al. |
| 2002/0004745 A1 | 1/2002 | Bascobert et al. ............. 705/14 |
| 2002/0029172 A1 | 3/2002 | I'Anson et al. ................ 705/26 |
| 2002/0035568 A1 | 3/2002 | Benthin et al. .............. 707/102 |
| 2002/0036654 A1 | 3/2002 | Evans et al. ................. 345/744 |
| 2002/0040297 A1 | 4/2002 | Tsiao et al. .................. 704/257 |
| 2002/0046084 A1 | 4/2002 | Steele et al. ................... 705/14 |
| 2002/0090934 A1 | 7/2002 | Mitchelmore |
| 2002/0133477 A1 | 9/2002 | Abel ................................ 701/1 |
| 2002/0143550 A1 * | 10/2002 | Nakatsuyama ........... 704/270.1 |
| 2002/0160772 A1 | 10/2002 | Gailey et al. ................. 455/428 |
| 2002/0161625 A1 | 10/2002 | Brito-Valladares et al. ..... 705/10 |
| 2002/0161646 A1 | 10/2002 | Gailey et al. ................... 705/14 |
| 2002/0161647 A1 | 10/2002 | Gailey et al. ................... 705/14 |
| 2002/0166127 A1 | 11/2002 | Hamano et al. ............. 725/105 |
| 2003/0041050 A1 | 2/2003 | Smith et al. ..................... 707/1 |
| 2003/0065620 A1 | 4/2003 | Gailey et al. ................... 705/51 |
| 2003/0065749 A1 | 4/2003 | Gailey et al. ................. 709/219 |
| 2003/0135853 A1 | 7/2003 | Goldman et al. .............. 725/34 |
| 2003/0154126 A1 | 8/2003 | Gehlot et al. .................. 705/14 |
| 2003/0182131 A1 * | 9/2003 | Arnold et al. ................ 704/275 |
| 2004/0166832 A1 | 8/2004 | Portman et al. .......... 455/412.1 |
| 2005/0102180 A1 | 5/2005 | Gailey et al. ................... 705/14 |

FOREIGN PATENT DOCUMENTS

| | | |
|---|---|---|
| JP | 11-046193 | 2/1999 |
| JP | 11-065434 | 3/1999 |
| JP | 11-069404 | 3/1999 |
| JP | 1999-0082755 | 11/1999 |
| JP | 2000-067047 | 3/2000 |
| JP | 2001-004387 | 1/2001 |
| JP | 2001-043479 | 2/2001 |
| JP | 2001-057593 | 2/2001 |
| JP | 2001-101000 | 4/2001 |
| JP | 2001-516905 | 10/2001 |
| JP | 2002-536755 | 10/2002 |
| SE | WO 00/29982 | 5/2000 |
| WO | WO 97/50002 | 12/1997 |
| WO | WO 98/49641 | 11/1998 |
| WO | WO 99/14743 | 3/1999 |
| WO | WO 99/62013 | 12/1999 |
| WO | WO 00/21232 | 4/2000 |
| WO | WO 00/46792 | 8/2000 |
| WO | 2000-268042 | 9/2000 |

OTHER PUBLICATIONS

Akiyama, T., Niwa, M. Watanabe, M., Tomikashi, M., Konishi, T., Itoh, Y., "Constructing a Natural Language Interface of Car Navigation Systems," Collection of Reports Produced to the Information Processing Academy, vol. 99, No. ITS-2, pp. 53-60, published by the Information Processing Academy on Jun. 1999; (Translation - Abstract only)

* cited by examiner

Fig. 3

| | | | | | | |
|---|---|---|---|---|---|---|
| → DO | YOU | HAVE | ANY | SPECIALS | ON | DVD | PLAYERS? |
| → DO | YOU | HAVE | ANY | DISCOUNTS | ON | DVD | PLAYERS? |
| → DO | YOU | HAVE | ANY | DVD | PLAYERS | ON | SALE? |

| | | | | | | | |
|---|---|---|---|---|---|---|---|
| → DO | YOU | HAVE | ANY | SPECIALS | ON | DVD | PLAYERS? |
| VERB | PRONOUN | VERB | ADJ | NOUN | PREPOSITION | NOUN | NOUN |
| → DO | YOU | HAVE | ANY | DISCOUNTS | ON | DVD | PLAYERS? |
| VERB | PRONOUN | VERB | ADJ | NOUN | PREPOSITION | NOUN | NOUN |
| → DO | YOU | HAVE | ANY | DVD | PLAYERS | ON | SALE? |
| VERB | PRONOUN | VERB | ADJ | NOUN | NOUN | PREPOSITION | NOUN |

100, 102, 104

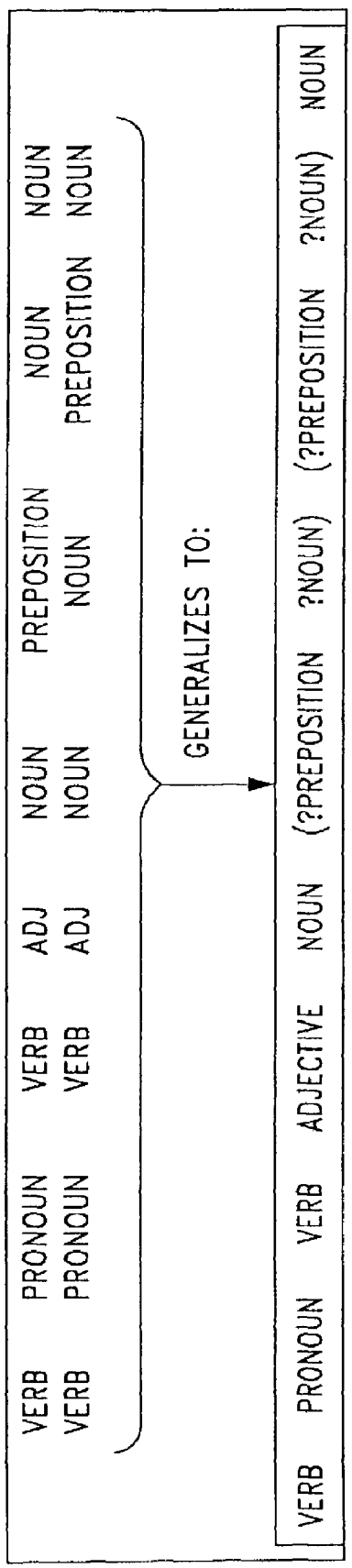

NATURAL LANGUAGE PROCESSING FOR A LOCATION-BASED SERVICES SYSTEM

This application is a continuation-in-part of U.S. application Ser. No. 09/946,111, filed Sep. 4, 2001, now U.S. Pat. No. 6,994,447, issued Sep. 13, 2005. This application claims the benefit of the filing date under 35 U.S.C. §119(e) of U.S. Provisional Application Ser. No. 60/286,916, filed Apr. 27, 2001. In addition, the following commonly owned patents and patent applications, some of which are incorporated by reference in the present application, are related to this application: U.S. patent application Ser. No. 10/133,536, filed Apr. 26, 2002. entitled ADVERTISING CAMPAIGN BUSINESS LISTING MANAGEMENT FOR A LOCATION-BASED SERVICES SYSTEM; U.S. Pat. No. 6,848,542 B2, issued Feb. 1, 2005, entitled METHOD FOR PASSIVE MINING OF USAGE INFORMATION IN A LOCATION-BASED SERVICES SYSTEM: U.S. patent application Ser. No. 10/133,118, filed Apr. 26, 2002, entitled ROUTING CALL FAILURES IN A LOCATION-BASED SERVICES SYSTEM: U.S. patent application Ser. No. 10/134,405, entitled TRACKING PURCHASES IN A LOCATION-BASED SERVICES SYSTEM: and U.S. patent application Ser. No. 11/007,761, filed Dec. 8, 2004, entitled PASSIVE MINING OF USAGE INFORMATION IN A LOCATION-BASED SERVICES SYSTEM.

FIELD OF THE INVENTION

The present invention relates generally to a natural language processing application and, more particularly, to providing an enhanced natural language processing application for interpreting structured requests for products and services in a location-based services system.

BACKGROUND OF THE INVENTION

Wireless communication devices have recently evolved from a technology used by an elite segment of the population to a technology that is used by the masses. In the year 2000, it has been estimated that well over 100 million people in the United States alone subscribed to at least one type of wireless communication service. Worldwide, the number of wireless communication device users has reached a staggering number and is growing all of the time. In the near future, it is envisioned that almost everyone will own or use some sort of wireless communication device that is capable of performing a variety of functions.

In addition to traditional wireless communication devices, many different types of portable electronic devices are in use today. In particular, notebook computers, palm-top computers, and personal digital assistants (PDA) are commonplace. The use of wireless communication devices is widespread and it is expected that in the near future combined mobile telephone/PDA devices will be widely used by the masses. Currently, most of these devices are only used by a small segment of the population due, in large part, to the fact that there are a limited number of applications and services available for such devices.

The Internet has become a widely used medium for providing business information in a variety of forms that are targeted to various types of individuals and businesses. Generally speaking, one of the problems associated with searching for business information on specific products and services using the Internet is being able to locate relevant business information for products and services that are available in a geographic area that is located near the user. As such, a need exists for a way to provide a broad range of business information and content to wireless communication devices and workstations that are based on the respective geographic location of the communication device at the time the information is requested.

In addition, most users of wireless communication devices would like the ability to use natural language when requesting information and content. Typical speech recognition applications require a developer to create an all-encompassing grammar that itemizes each possible way a person could utter any given concept or request. While this enables a system to recognize content contained in an utterance, it places a significant burden on the developer both before and after the system is deployed. As such, a need exists for a natural language processing application that does not require significant setup and maintenance. Additionally, due to the various speech patterns and utterances, it is currently impossible to obtain a near 100% successful recognition of utterances. While current speech recognition engines are tuned to interpret sound, they cannot interpret meaning or understanding of context.

SUMMARY OF THE PRESENT INVENTION

A preferred embodiment of the present invention discloses a method of providing natural language processing in a communication system. In this preferred embodiment, a voice request is generated with a remote terminal that is transmitted to a base station. Once the voice request is sent to the base station, each word contained in the voice request is identified with a speech recognition application. After the words are identified with the speech reconition application, a grammar that is associated with each word is identified with a natural language processing application. Once the words and their associated grammars have been identified, each word is categorized into a respective grammar category. A structured response to the voice request is then generated with a response generation application.

In this preferred embodiment of the present invention, a structured request is generated by the natural language processing application that is based on the categorization of the words into grammar categories as well as the identification of the words. After the structured request is generated, it is transmitted to a response generation application that searches for matches to the structured request in a database of products and services. Another aspect of the present invention involves the narrowing of structured responses that are generated by the response generation application to a specific geographic area in which the remote terminal is located. As such, a user of the remote terminal does not receive responses to voice requests that are for products or services that are not located in a geographic region near the user. For example, a person in Atlanta, Georgia does not particularly care if a retail store in California is running a special on an item that he or she is interested in purchasing near his/her geographic location.

As generally set forth above, the voice request is a request for a particular product or service. As used herein, the term "product" should be broadly construed to also include services. In the preferred embodiment, the structured responses that are generated to respond to the voice requests may either take the form of voice responses or text messages that may include images and/or sound files. After the voice response or the text message is generated, it is transmitted to the remote terminal so that the user of the remote terminal can interact with the structured response.

Coupling a natural language processing application to the location-based services system helps to bridge the gap between speech recognition and processing structured requests by improving speech recognition not only through the recognition of "utterances" but by also inferring the correct question and resulting answer trough the use of natural language. Natural language processing improves user experience by inferring, through the use of linguistics, the word(s) that were not recognized, thus enabling the resulting application to retrieve a more relevant answer.

Another preferred embodiment of the present invention discloses a wireless communication system with natural language processing. In this embodiment of the present invention, a remote terminal is connected to a base station, wherein a user of the remote terminal is capable of generating a voice request that is transmitted to the base station. Once the voice request reaches the base station, it is preferentially transmitted to a speech recognition application that is connected to the base station. During operation, the speech recognition application identifies each word contained in the voice request. After the words are identified by the speech recognition application, a natural language processing application that is connected to the speech recognition application generates a structured request that is based on the words contained in the voice request. A response generation application is connected to the natural language processing application and is responsible for generating a structured response to the structured request.

In this preferred embodiment of the present invention, the natural language processing application categorizes the words contained in the voice request into a respective one of a plurality of grammar categories. Once the words are placed in the grammar categories, they are used by the response generation application to locate a product identified in the voice request, thereby responding to the structured request. The structured response can be transmitted to the remote terminal as a voice response or a text message. If a voice response is used, a voice synthesis application that is connected to the response generation application generates the voice response, which is based on the structured response that is generated by the response generation application.

Further objects and advantages of the present invention will be apparent from the following description, reference being made to the accompanying drawings wherein preferred embodiments of the invention are clearly illustrated.

BRIEF DESCRIPTION OF THE DRAWINGS

FIG. 3 illustrates the varying ways user requests may be made and provided as an input to the speech recognition application.

FIG. 4 illustrates the grammars associated with the words of the user requests depicted in FIG. 3.

FIG. 5 illustrates how the grammars from the user requests generalize down to a set of grammars.

FIG. 6 illustrates the grammar categories for which each word falls into from the user requests depicted in FIG. 3.

DETAILED DESCRIPTION OF THE PRESENTLY PREFERRED EMBODIMENTS OF THE INVENTION

Figure 1:
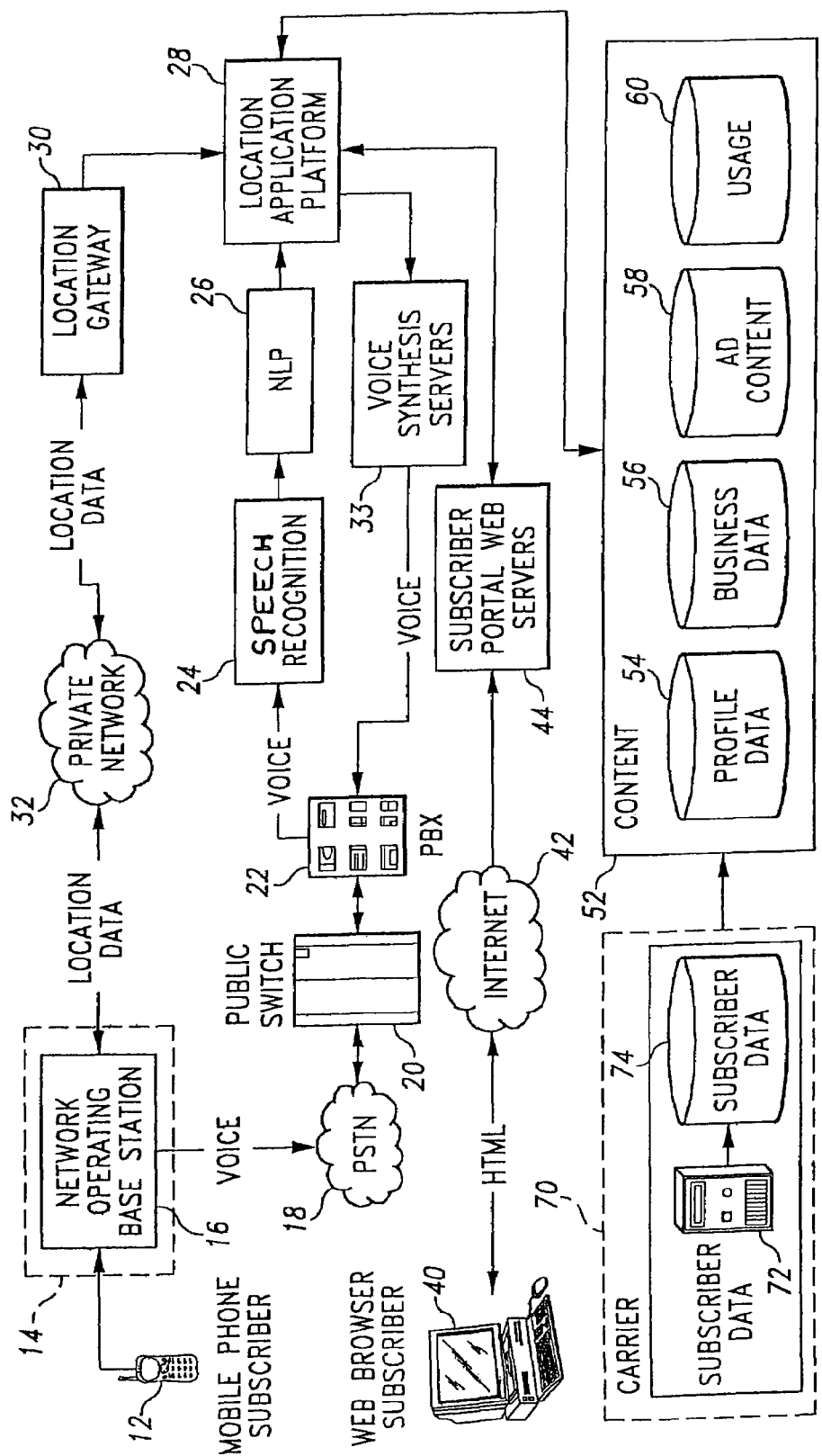
FIG. 1 illustrates a preferred embodiment of the location-based services system.

The preferred embodiment of the present invention is used in a location-based services system that provides content to communication devices through a variety of communication networks. Referring to FIG. 1, the preferred location-based services system 10 takes advantage of the geographic location of a remote terminal 12 to provide geographically targeted services to the remote terminal 12. Remote terminals 12 that subscribe to the location-based services system 10 are capable of receiving information from a broad range of business and service providers that are located in a geographic region that is close to the remote terminal 12 and, thus, the user.

As illustrated in FIG. 1, one preferred embodiment of the location-based services system 10 includes a remote terminal 12 that is connected to a wireless communication system 14 using one of several available and commonly used communication protocols. As illustrated, the remote terminal 12 is connected to a base station 16 of the wireless communication system 14, which transmits and receives radio signals to the remote terminal 12 during operation. Those skilled in the art would recognize that although only one base station 16 is illustrated in FIG. 1, several base stations 16 are actually used to make-up the preferred wireless communication system 14. Ideally, the preferred wireless communication system 14 would cover a wide geographic region, such as, by way of example only, the entire United States.

In the preferred embodiment of the present invention, the remote terminal 12 is capable of sending a digital input signal to the base station 16. The term digital input signal should be broadly construed to include voice signals that are generated by a user of the remote terminal 12. Preferentially, the wireless communication system 14 is a digital communication system that uses one of several different methods of providing wireless digital communication between the remote terminals 12 and the base stations 16. The wireless communication system 14 can use frequency division duplexing (FDD) or time division duplexing (TDD) to allocate for the two directions of transmission between the remote terminal 12 and the base station 16.

In order to provide multiple access methods to the remote terminals 12, which refers to the method of creating multiple channels for each transmission direction, one of several different types of multiple access methods may be used in the present invention. Three preferred types of multiple access methods that might be used include: frequency division multiple access (FDMA); time division multiple access (TDMA); and/or code division multiple access (CDMA). Those skilled in the art would recognize that the present invention could readily be adapted to take advantage of other multiple access methods as well.

As further illustrated in FIG. 1, in the preferred embodiment of the present invention the base station 16 of the wireless communication system 14 is connected to a public switched telephone network (PSTN) 18 by a public switch 20. As known to those skilled in the art, the PSTN 18 is a worldwide voice telephone network that is used to allow various communication devices to communicate with each other. Although the preferred PSTN 18 is a digital system, the present invention may be adapted for use on analog systems as well to accommodate geographic regions that might be underdeveloped or not serviced by a digital system.

The public switch 20 transfers the voice signals that are received from the base station 16 to a private branch exchange (PBX) 22. The public switch 20 is connected to the PBX 22, which, as generally known in the art, is a telephone switching system that is used to interconnect various telephone extensions to each other. In the preferred embodiment of the present invention, the PBX 22 uses all-digital methods for switching and is capable of supporting digital remote terminals and telephones and analog remote terminals and telephones. As set forth in greater detail below, in the preferred embodiment, the PBX 22 is connected to a server of the location-based services system 10, which is a form of a digital remote terminal.

Referring to FIG. 1, in this embodiment of the present invention, the PBX 22 is connected to at least one speech recognition sewer 24. The speech recognition server 24 contains at least one speech recognition application that is operable to recognize the respective words that are contained in the voice signals that are received from the PBX 22. As set forth in greater detail below, a resulting output is generated by the speech recognition application that is used by a natural language processing application.

The speech recognition server 24 is connected to at least one natural language processing server 26 that includes at least one natural language processing application that processes the identified words contained in the voice signals to ascertain the meaning of the words that are contained in the voice signals. As such, during operation, the speech recognition server 24 identifies or recognizes the particular words that are contained in the voice signals and the natural language processing server 26 interprets the meaning of the recognized words of the voice signals that are originally generated from the remote terminal 12. The natural language processing application may be located on the speech recognition server 24 in other embodiments of the present invention, but, in an effort to increase the level of performance, would preferentially be located on a separate server or a separate set of servers.

The natural language processing server 26 is connected to at least one location-based application server 28. As set forth in detail below, the location-based application server 28 is programmed to provide responsive information to the remote terminals 12 that has been requested by a respective user of the remote terminal 12. Generally speaking, the location-based application server 28 is used to retrieve and pass on location-based information to the remote terminals 12 in various data formats. The type of information provided to the remote terminals 12 varies depending on the specific nature of the information that has been requested from the user and the geographic location of the remote terminal 12.

During operation, after the meaning of the words in the voice signals are interpreted, the natural language processing server 26 is programmed to create a structured request that is sent to the location-based application server 28. In response to the structured request, the location-based application server 28 generates a structured response that is sent to the remote terminal 12. As set forth in greater detail below, the exact nature of the information sent in the structured response depends on the specific request that is made by a particular user of the remote terminal 12.

If an analog voice signal is used, although not illustrated in FIG. 1, at least one digital signal processor server could be used to convert the analog signal into a digital signal that the speech recognition server 24 can process and interpret using the speech recognition applications. In this respective embodiment, the digital signal processor server is preferentially connected between the speech recognition server 24 and the PBX 22. Those skilled in the art would recognize that the speech recognition server 24 might also be designed to perform the functions of the digital signal processor server in other embodiments of the present invention.

Each remote terminal 12 also sends a unique remote terminal identifier to the base station 16 while communicating with the base station 16 of the wireless communication system 14. The remote terminal identifier is preferentially attached to each voice signal as it passes through the location-based services system 10 so that the system can keep track of which respective remote terminal 12 is supposed to receive the information that has been requested. Those skilled in the art would recognize that various identification methods might be used to keep track of specific remote terminals 12 using the location-based services system 10.

As further illustrated in FIG. 1, the location-based application server 28 is also connected to a location gateway server 30, which is, in turn, connected to the base station 16 of the wireless communication system 14. The location gateway server 30 is used by the location-based application server 28 to retrieve a geographic indicator that is associated with each respective remote terminal 12. As such, while a respective remote terminal 12 is connected to the wireless communication system 14, the location-based application server 28 is capable of determining the respective geographic location of the remote terminal 12 so that geographically targeted responses and information can be provided to the remote terminal 12.

As illustrated in FIG. 1, the location gateway server 30 is preferentially connected to the base station 16 of the wireless communication system 14 using a network connection 32, which may be a private network connection or an Internet connection in alternative embodiments of the present invention. The geographic indicator may be generated by the remote terminal 12 or the base station 16 and is preferentially transmitted to the location-based application server 28 when a user of the remote terminal 12 is accessing the location-based services system 10. The geographic indicator is preferentially transmitted to the location-based application server 28 with the remote terminal identifier so that the location-based application server 28 can associate each respective remote terminal 12 with a particular geographic location.

In the preferred embodiment of the present invention, the geographic indicator may be preset by a user of the remote terminal 12, automatically generated by a GPS located in the remote terminal 12 or generated by a specialized geographic determination application running on the base station 16. In addition, the present invention may advantageously take advantage of an enhanced 911 system of the wireless communication system 14 to generate the geographic indicator. In another embodiment of this invention, the geographic indicator may originate from a combination of these sources and/or systems (i.e., it could come from a GPS-assisted network that uses GPS and devices on the network). The geographic indicator may automatically be sent to the location-based application server 28 as soon as a respective remote terminal 12 connects to the wireless communication system 14; however, in alternative embodiments of the present invention, the geographic indicator is only sent when a respective remote terminal is sending a structured request to the location-based application server 28. As the geographic location of the remote terminal 12 changes, the geographic indicator is updated and the updated information can continuously be sent to the location-based application server 28.

As further illustrated in FIG. 1, at least one voice synthesis server 33 is connected to the location-based application server 28 and the PBX 22. For voice-related applications of the location-based services system 10, the voice synthesis server 33 is used to generate voice responses that are based on the structured responses that are generated in response to the structure requests that are received by the location-based application server 28. Voice synthesis applications on the voice synthesis server 33 are used to transform the structured responses into voice response. In the preferred embodiment, the PBX 22 is used to transmit the voice responses to the PSTN 18, which, in turn, transmits the voice response to the base station 16, which ultimately transmits the voice response on to the remote terminal 12. In alternative embodiments of the present invention, the voice synthesis server 33 may be connected directly to respective base stations 16 of the wireless communication system 14.

Referring to FIG. 1, in yet another preferred embodiment of the location-based services system 10, a second remote terminal 40 is connected to a subscriber portal web server 44 through a network connection 42. The network connection 42 may be a private network connection or an Internet connection. As illustrated, the subscriber portal web server 44 is also connected to the location-based application server 28. During operation, the second remote terminal 40 is programmed to receive structured requests that are sent to the location-based application server 28 and, likewise, the location-based application server 28 is programmed to generate structured responses that are sent to the second remote terminal 40.

The second remote terminal 40 and the location-based application server 28 preferentially communicate with each other using standard web-based protocols that are commonly used in various Internet-based applications. In this embodiment of the present invention, a user accesses the subscriber portal web server 44 through the second remote terminal 40, which is preferentially a computer workstation. As a subscriber to the location-based services system 10, the second remote terminal 40 is assigned a predetermined geographic indicator. The geographic indicator is used by the location-based application server 28 to target services and business content to the second remote terminal 40 that are based on the geographic location of the second remote terminal 40.

The user of the second remote terminal 40 may be given the option of setting the geographic indicator to a desired geographic location, which may or may not be the exact geographic location of the second remote terminal 40. For example, if the user is traveling to another city that evening and wants to access location-based services in that particular city, an option can be provided allowing the second remote terminal 40 to designate that particular city.

In this preferred embodiment of the present invention, the second remote terminal 40 is preferentially a computer workstation that includes multimedia capabilities and includes a microphone and a sound card. As known to those skilled in the art, this allows the second remote terminal 40 to generate sound through a speaker system and receive voice signals through the microphone. Although not specifically illustrated in FIG. 1, this could allow the subscriber portal web server 44 to be connected to the speech recognition server 24 so that voice signals sent from the second remote terminal 40 could be processed similar to the method used to process voice signals received from wireless remote terminal 12.

As further illustrated in FIG. 1, the preferred location-based services system 10 is also capable of leveraging data that is preferentially grouped in four logical data groupings 52. These logical data groupings include profile data files 54, business data files 56, additional data files 58 and usage data files 60. The data files 54-60 contain detailed information on various items and services that are used by the location-based services system 10, which is set forth in detail below. The data files 54-60 can be located on the location-based application server 28, but are preferentially maintained on separate servers.

The profile data files 54 contain a group of logical entities that contain relevant information concerning each consumer of the location-based services system 10. These logical entities include, but are not specifically limited to the following items: consumer name; consumer phone number; consumer identification; consumer password; consumer home address; consumer home phone number; consumer email address; consumer pager number; consumer service subscriptions (detailing the consumers chosen level of participation in one or more services); consumer privacy preferences (detailing information denoting the willingness to share a consumers private data with others based on data type, requester, service, etc.); consumer service preferences (detailing any specific saved information that is relevant to any of the services which a consumer may use, such as: named locations (such as the address for a consumers work location, or the address(es) of a consumers friend(s); named interests or preferences regarding hobbies, news topic interest, sports, music, preferred brands or chains, banking information and other demographic information. (such as NBA basketball, Jazz music, Italian food, favorite clothing brands or chains, banking information, etc.)); and preferred asynchronous communication method (such as email or pager) listed by service and/or service/content provider.

The business data files 56 are composed of a group of logical entities containing all relevant information regarding the businesses listed within the location-based services system 10, including but not limited to: business name; business phone number; business text description; business audio description; business video description; business and/or product images; business identification; business password; business category or categories; advertising participation level; advertising campaign information such as: parameters that define target market; campaign identification code; advertising content and special deals/discounts; saved data mining/reporting parameters; brands sold; brands serviced; product types sold; services provided, product types serviced; product models sold; product models serviced; product model prices; and service prices and inventory list (by brand, product type and product model).

The additional data files 58 contains a group of logical entities that generally includes any additional content that is capable of being leveraged by the location-based services system 10, possibly including, but not limited to: business ratings (via external evaluation services); weather conditions; driving directions; maps; traffic Although not specifically illustrated, the residential telephone number and address listings may be provided by local telephone companies through a residential listing server that is connected to the location-based application server 28.

The usage data files 60 contains a group of logical entities that generally includes all recorded information regarding consumer transactions from remote terminals 12, 40, possibly including, but not limited to: consumer identification (or a unique hash of consumer identification); date; time; service used; request type; search criteria; matched data purchases made, and actions taken. Those skilled in the art would recognize that several other types of usage data might be stored in the usage data files 60.

As generally set forth above, users of the location-based services system 10 are given the ability to search, via a remote terminal 12, 40, for a business that will satisfy specific purchase or service requirements using multiple access methods (voice, wireless application protocol or web application protocol). The location-based application server 28 is programmed to handle a variety of structured requests and is capable of generating a variety of structured responses in the same format (i.e.—voice, wireless application protocol or web application protocol) that the structured request was received by the location-based application server 28.

Some of the structured request parameters that are capable of being used for the business services provided by the location-based services system 10 include (but are not necessarily limited to) one or more of the following: product type; service type; business name; business category; product name (or model name); product brand; price level; business or service ratings (i.e. external evaluation from a rating service such as AAA); whether special deals are provided; location (auto-location (locating nearest ATM for instance), predefined locations, or consumer-specified locations); hours of operation; availability of service (for example: availability of a open table at a specified time at a restaurant); and company specified within favorites for a category (i.e., name of favorite coffee house franchise). Those skilled in the art would recognize that a variety of structured request parameters might be used in the present invention.

As briefly set forth above, the location-based services system 10 provides a consumer using a remote terminal 12, 40 with access to products and services in a designated geographic area through multiple access methods such as voice, wireless application protocols (such as WAP and cHTML) and web protocols (such as Java and HTML). The present invention encompasses the full lifecycle of the location-based services system 10 including delivery and maintenance, which includes content management, consumer management, content delivery, advertising management, advertising reporting, advertising delivery, usage tracking, usage mining and reporting, billing and settlements.

The preferred location-based services system 10 is capable of providing location-based services to consumers through remote terminals 12, 40 and is managed by various content providers through the use of respective business remote terminals 46. The services that are provided through the location-based services system 10 preferentially includes an enhanced directory assistance service and an enhanced business service that is delivered through a speech recognition capability, wireless application protocol capability and/or web application capability In order to access the enhanced directory assistance services or the business services, the user of the remote terminal 12 preferentially enters a predetermined key sequence (e.g.— by pressing 411) on the keypad of the remote terminal 12 or by pressing a specially designed key on the remote terminal 12. If the remote terminal is not connected to the base station 16 already, when the enhanced directory assistance services or business services are selected, the remote terminal 12 establishes a connection with the base station 16 of the wireless communication system 14, which acts as a gateway to the location-based services system 10.

In another embodiment, in order to select one of the respective services, the user of the remote terminal 12 is given the option of using voice commands, but as previously set forth may also use keypad inputs on the remote terminal 12 to select the desired services as well. Those skilled in the art should recognize that the enhanced directory assistance services and the business services do not necessarily have to be provided through the same access method and that a keypad-based menu system may be used until the appropriate time occurs for the user to input a voice signal containing a request for information.

By way of example only, if the enhanced directory assistance services are selected by a user of the remote terminal 12, either the base station 16, the location-based application server 28 or remote terminal 12 can be programmed to generate a search parameter request that is audibly generated on the remote terminal 12. In the embodiment being discussed, the search parameter request is sent in the form of a voice signal that prompts the user to state the first and last name of the person they are looking for. In addition, the search parameter request could also include an option that might prompt to user to also state the geographic area where the person is located. As should be apparent from the discussion above, since the location-based services system 10 includes speech recognition applications, those skilled in the art should recognize that the entire process of entering the search parameter request may be done by voice signals generated on the remote terminals 12.

In response to the search parameter request that is generated on the remote terminal 12, the user preferentially provides a vocal response to the remote terminal that is transmitted to the base station 16. The vocal response preferentially includes a first name response and a last name response (and possibly a detailed geographic information response for non-local listings) of the particular person the user is looking to retrieve information on. The vocal response to the search parameter request, which preferentially also includes a unique remote terminal identifier that is associated with each respective remote terminal 12, is then sent from the remote terminal 12 to the base station 16. The base station 16 transmits the voice response to the PSTN 18, which then routes the vocal response, together with the remote terminal identifier, to the PBX 22.

The PBX 22 transmits the vocal, response and the remote terminal identifier as inputs to speech recognition applications and natural language processing applications that are located on servers 24, 26, which in turn, respectively transform the vocal response and the remote terminal identifier into a structured residential listing request that is sent to the location-based application server 28. As set forth in detail above, the speech recognition applications analyze the vocal responses for the purposes of making a determination of the identity of particular words contained in the vocal responses. Any detailed geographic information provided by the user is also added to the structured residential listing request that is sent to the location-based application server 28.

Figure 2:
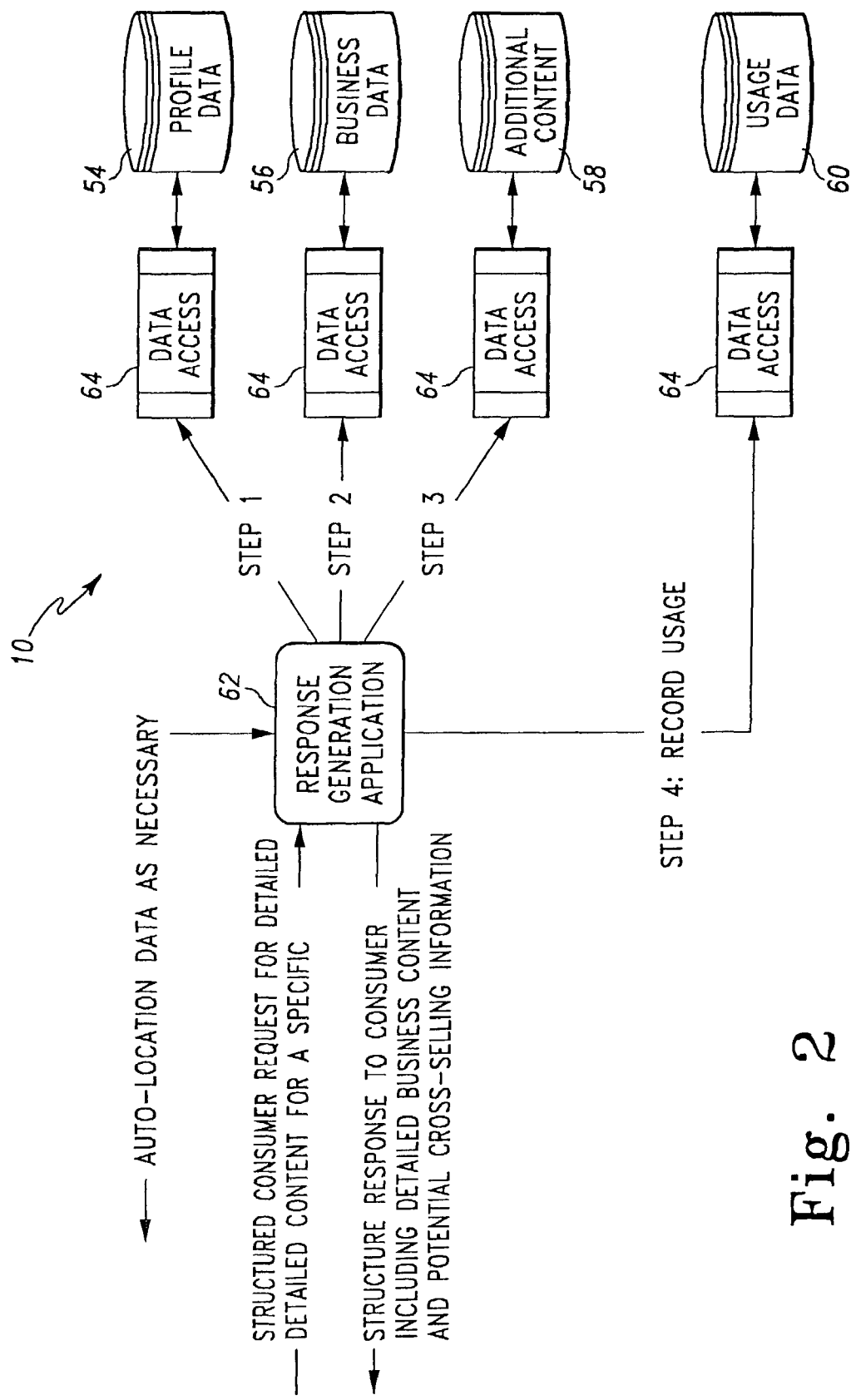
FIG. 2 is a flow chart illustrating the process steps performed by the location-based application server when processing structured requests.

As illustrated in FIG. 2, the structured residential listing request is used as an input to a residential finder application 62 located on the location-based application server 28. In other embodiments of the present invention, the residential finder application is referred to as business/services finder application 62 and response generation application 62. During operation, the residential finder application 62 interprets the structured residential listing request and uses at least one data access routine 64 to locate and retrieve the specific information requested by the structure residential listing request from a respective database file 54-58. Those skilled in the art should recognize that several database servers may be connected to the location-based application server 28 that are used to store various forms of information and content that is provided to users by the location-based services system 10 in varying types of formats, which will be set forth in greater detail below.

In the preferred embodiment of the present invention, the residential finder application 62 matches up the structured residential listing request with the geographic indicator of the remote terminal 12. If no geographic information is contained in the structured response, the residential finder application 62 conducts a search of the profile data files 54 and the additional data files 58 with data access routines 64 targeted within a predetermined area based on the geographic location of remote terminal 12. If geographic information is included in the vocal response, the residential finder application 62 conducts a search within the geographic area specified by the user. As set forth above, in the preferred embodiment of the present invention the residential listing database files are stored under the additional data files 58 by way of example only and should not be construed as a limitation of the present invention.

The residential finder application 62 preferentially also searches the profile data files 54 so that if the identity of the person contained in the structured residential request is identified as a subscriber of the location-based services system 10, a remote terminal 12 telephone number and/or an email address may also be added to the response that is provided to the user requesting the desired information. If the located person does turn out to be a subscriber of the location-based services system 10, other embodiments of the present invention allow the subscriber to create a personalized response that is stored in a database file and is provided in response to residential listing requests that identify them.

In addition to receiving the structured residential listing requests, the residential finder application 62 obtains a geographic indicator and a remote terminal identifier associated with the remote terminal 12. This allows the system to default to the geographic location of the remote terminal 12 to conduct the search, as set forth above. For instance, if the remote terminal 12 is located in Atlanta, Georgia, the residential finder application 62 will know this from the geographic indicator and will only search listings in the Atlanta area.

Once the appropriate data is located by the residential finder application 62 that is responsive to the structured residential listing request, which in the present example would preferably include at least one telephone number and/or the address of the person(s) named in the voice signal, the residential finder application 62 is operable to generate a structured residential response that is sent to voice synthesis server 33. As set forth in detail above, the voice synthesis server 33 is programmed to transform the structured residential response into a voice response signal with voice synthesis applications located on the voice synthesis server 33.

As set forth briefly above, the voice response that are generated by the voice synthesis server 33 can include the name, address, residential telephone number, mobile number and/or email address of the particular person for which the user has requested a residential listing. For those instances where the structured residential responses include more than one residential listing, the residential listing finder application 62 is preferably programmed to generate a structured residential response that provides the multiple listing results in a predetermined organized listing arrangement.

The predetermined organized listing arrangement is preferentially set up so that the user of the remote terminal 12 is capable of interacting with the listings provided in the voice response through the use of a keypad input or by voice signals that are spoken into the remote terminal 12 by the user. Preferably, the information is organized and presented to the user of the remote terminal 12 based on the address of the particular people identified by the residential finder application 62; however, those skilled in the art would recognize that other alternatives of presenting and organizing the results exist (i.e., ranking the results in geographic order) are capable of being used in varying embodiments of the present invention.

If the person for whom information has been requested is designated as being unlisted or unavailable, the location-based application server 28 is preferably programmed to generate a structured residential response that contains a message that indicates that the requested information is unlisted or unavailable. As such, in this particular embodiment of the present invention, the location-based application server 28 sends the structured residential response to the voice synthesis server 33, which generates a voice signal that is sent to the remote terminal 12 informing the user that requested the residential listing that the requested residential listing it unlisted or unavailable.

As briefly set forth above, another preferred embodiment of the location-based services system 10 is capable of providing business services to the remote terminal 12, which are provided to the remote terminal 12 based on the geographic location of the remote terminal 12. If the user of the remote terminal 12 selects the business services option instead of the enhanced directory assistance services option, a variety of information services are capable of being delivered to the user through the location-based services system 10. During operation, the business services are provided to the remote terminal 12 through similar access methods that the residential listing services are provided to the remote terminal 12. In addition to being able to obtain the address and telephone number of local businesses, various other forms of business information is capable of being transmitted to the remote terminal 12 by the location-based services system 10.

As generally set forth above and in greater detail below, some of the preferred structured business request parameters that are capable of being processed by the business services of the location-based services system 10 include (but are not necessarily limited to) one or more of the following parameters: product/service types; business names; business category; product name (or model name); product brands; price level; business or service ratings (e.g.—external evaluation from a rating service such as AAA); whether special deals or offers are being provided; auto-location of predefined services (e.g.—locating the nearest ATM for instance); hours of operation; availability of service (e.g.—availability of a open table at a specified time at a restaurant); and/or business information specified within a user defined favorites category (e.g.—name of favorite coffee house franchise, favorite clothing brands, favorite restaurants).

In this preferred embodiment of the present invention, once a user of the remote terminal 12 gains access to the business services provided by the location-based services system 10, he/she is prompted by a voice signal requesting the user to state his/her respective business request. In response to the prompt for a business request, the user states a vocal response that is received by the remote terminal 12 that contains a request for a predetermined type of business content. The exact nature and content of the vocal response will vary, depending on the specific type of business/service information that is being requested by the user of the remote terminal 12. As set forth above and below, the preferred embodiment of the present invention includes natural language processing applications that are used to interpret the meaning and context of the words contained in the vocal response, thereby allowing the user of the remote terminal 12 to make a request using requests that are spoken using statements commonly used in everyday conversations.

By way of example only, let's say that a respective user of the remote terminal 12 wants to obtain business information related to determining the location of a favorite local fast-food restaurant. As such, the user's vocal response that is received by the remote terminal 12 might contain a voice signal that includes a request for business information that could be phrased something along the lines of the following statement: "What is the address of a Burger King restaurant that is close to my present location?" As previously set forth, this preferred embodiment of the present invention is capable of interpreting this request using natural language processing applications to generate a structured response.

As with the residential services, in this embodiment of the present invention, the vocal response that is provided by the user of the remote terminal 12 is transmitted from the remote terminal 12 to the base station 16 of the wireless communication system 14, which, in turn, is operable to transmit the vocal response to the PSTN 18 that transmits the vocal response to the PBX 22. The vocal response is then sent from the PBX 22 to the speech recognition server 24 where it is processed with speech recognition applications to determine the identity or recognize the respective words that are contained in the vocal response from the user containing a business information request. Although not illustrated, in an alternative embodiment of the present invention, the base station 16 is directly connected to the speech recognition server 24, thereby allowing the base station 16 to directly transmit vocal response to the speech recognition server 24.

After the words contained in the vocal response have been recognized using speech recognition applications, a respective output is generated by the speech recognition applications, which is used as an input to natural language processing applications. As set forth in detail above, the natural language processing applications determine the meaning and context of the words contained in the vocal response that is received by the remote terminal 12. Referring once again to FIG. 2, once the meaning and context of the recognized words contained in the vocal response have been determined, the natural language application is programmed to generate a structured business request that is sent to the location-based application server 28. The location-based application server 28 includes at least one business/services finder application 62 that is operable to process the structured business request by retrieving the requested information.

As set forth in detail above, the remote terminal 12 also sends a remote terminal identifier with the vocal response that is preferentially integrated in some manner with the structured business request that is ultimately generated and sent to the location-based application server 28. In addition, in this preferred embodiment of the present invention as well as others, a geographic indicator and a remote terminal identifier associated with the respective remote terminal 12 making the structured business request is also obtained or has already been obtained by the location-based application server 28. As illustrated in FIG. 2, the geographic indicator and the structured business request are used by the business/services finder application 62 to generate a structured business response that is responsive to the structured business request.

In our current example, the preferred business/services finder application 62 uses the geographic indicator of the remote terminal 12 to determine which particular Burger King location is closest to remote terminal 12. A mapping routine within the business/services finder application 62 compares the geographic location of the remote terminal 12 with the respective geographic locations of Burger King restaurants retrieved by the structured business request and makes the determination of which location is closest to the remote terminal 12, which can be based on the distance of the remote terminal 12 from each respective location. As illustrated in FIG. 2, this is accomplished by a data access routine 64 that accesses the appropriate information from the business data files 56, which preferentially contains a database of business listings, addresses, products and/or services provided.

After the appropriate information is located, the location-based application server 28 is programmed to generate a structured business response that is sent to the voice synthesis server 33. The voice synthesis server 33 converts the structured business response into a voice signal that is then sent to remote terminal 12. In this example, the structured business response would contain the address of the Burger King that is closest to remote terminal 12, which has been determined by the location-based application server 28 based on the geographic location of remote terminal 12.

In yet another example of this embodiment of the present invention, a user of the business services might request information on a retail store that sells a specific product or provides a specific service. For instance, a user might state: "Who sells or provides product/service (stating the particular product/service desired)?" After the speech recognition application and the natural language processing application interpret and transform the request into a structured business request the business/services finder application 62 uses the geographic indicator of remote terminal 12 to narrow the structured business request to retrieve business information contained within a predefined geographic area in which the remote terminal 12 is located. If more than one business sells the item or provides the requested service, the business/services finder application 62 is programmed to generate a structured business response that is sent to voice synthesis server 33 containing a listing of the respective businesses meeting the desired criteria. For a more detailed description of the location-based services system 10, refer to U.S. application Ser. No. 09/946.111, which is incorporated herein by reference in its entirety.

Referring to FIGS. 1 and 3, yet another preferred embodiment of the present invention discloses a method and system for providing enhanced natural language processing in a location-based services system 10. One embodiment of this invention enhances natural language processing by building and leveraging a grammar database that is organized based on parts of speech and intended purpose. This embodiment of the present invention provides a natural language processing application that is located on the natural language processing servers 26 that allows users of the remote terminals 12 to request information in many natural ways, without requiring the significant setup and maintenance that is required in menu-driven implementations. In the present preferred embodiment, altering the mechanism and structures of the grammars that are typically defined in a speech recognition system enables this capability.

As illustrated in FIG. 3, several different methods are set forth for verbally requesting if there are any specials or discounts on a digital video disc (DVD) player. Those skilled in the art should recognize that the requests set forth in FIG. 3 are intended to serve as an example only and that several other types of product or service requests may be made by consumers. As such, the various requests for specials or discounts on DVD players set forth in FIG. 3 should be viewed in an illustrative sense and by no means should be construed as a limitation of the present invention. The preferred embodiment of the present invention is designed to handle any type of consumer request for products or services.

The first voice request 100 illustrated in FIG. 3 is set forth as "Do you have any specials on DVD players?" The second voice request 102 is set forth as "Do you have any discounts on DVD players?" The third voice request 104 is set forth as "Do you have any DVD players on sale?" While these three requests 100-104 are somewhat different, they represent some of the varying methods for which a consumer would use natural language to ask a human salesperson in a store or over the telephone for specials on DVD players or any other type of product or service. As set forth in detail below, the present invention discloses a natural language processing application that is designed to handle the varying ways in which consumers request information, so that users of remote terminals 12 can use natural language when requesting information on products or services while using the location-based services system 10.

Each of the requests 100-104 in FIG. 3 has a particular word structure that is associated with the request 100-104, which can be referred to as a part of speech or a grammar. Parts of speech refer to how words are classified according to their particular function in sentences for the purpose of grammatical analysis. In the preferred embodiment of the present invention, during operation, the natural language processing application that is located on the natural language processing server 26 divides each spoken request into one of eight parts of speech or grammars. The eight parts of speech or grammars into which each verbal request is preferentially broken down include: nouns, adjectives, adverbs, prepositions, conjunctions, pronouns, verbs and interjections. Most major languages use the above-referenced eight parts of speech or grammars and, as such, the present natural language processing application is versatile for application in almost any spoken language. For the purpose of the present invention, it is worthwhile to note the function of these grammars and how they are used by the natural language processing application.

A noun is a word that is usually used to denote a thing, place, person, quality, or action. In a sentence, a noun is the subject or object of action expressed by a verb or as the object of a preposition. In some languages, nouns and verbs can sometimes take the same form. In the present preferred embodiment, the natural language processing application uses the identified nouns from verbal requests 100-104 to determine the thing or object that a user of the remote terminal 12 is requesting. As such, referring to FIG. 4, in our present example, the terms specials, DVD, players, discounts and sale are viewed by the natural language processing application as the nouns of the requests 100-104. During operation, the preferred location-based services 10 will use these terms to locate the product being requested by a user of the remote terminal 12.

An adjective is a part of speech that modifies, or qualifies, a noun or pronoun, in one of three forms of comparative degree. The three forms of comparative degree an adjective can modify or qualify a noun or pronoun are: positive (e.g., cheap), comparative (e.g., cheaper), or superlative (e.g., cheapest). The natural language processing application will generally use the adjectives contained in the verbal requests 100-104 to generate structured requests that narrow the search that is conducted for a particular product or service. For example, if a request for "the cheapest DVD player" is received, the preferred embodiment will exclude high-priced or top-of-the-line DVD players from the structured responses that are provided to a user of the remote terminal.

An adverb is a part of speech that modifies a verb (purchase inexpensively), an adjective (a very cheap DVD player), or another adverb (purchase very inexpensively). Adverbs may indicate place or direction (where, whence), time (still, immediately), degree (very, inexpensive), manner (thus, and words ending in ly, such as locally), and belief or doubt (perhaps, no). Like adjectives, adverbs may be also be comparative (reasonably, most wisely). As set forth above in relation to adjectives, the natural language processing application will also use the adverbs identified in verbal requests 100-104 to limit or narrow the structured request that is generated and sent to the response generation application 62.

Prepositions are words that combine with a noun or a pronoun to form a phrase. In languages such as Latin or German, prepositions change the form of the noun or pronoun to the objective case or to the possessive case. Conjunctions are the words that connect sentences, clauses, phrases, or words, and sometimes paragraphs. Coordinate conjunctions (e.g., and, but, or, however) are used to join independent clauses, or parts of a sentence; subordinate conjunctions introduce subordinate clauses (where, when, because, if, since, whether). Again, prepositions and conjunctions are used by the natural language processing application to formulate structured requests that are more targeted to the specific requests of users of remote terminals 12 so that the results are more accurate. For example, if a user states that they want "specials on steak dinners or seafood dinners," the natural language processing application will generate a structured request for specials on those two particular types of dinners.

A pronoun is an identifying word that is used instead of a noun and inflected in the same way that nouns are when spoken. In English, there are several different types of pronouns. Personal pronouns consist of: I, you, he/she/it, we, you and they. Demonstrative pronouns are this, that, and such. Who and which are interrogative pronouns when introducing questions and when introducing clauses, they are relative pronouns. In the preferred embodiment of the present invention, although pronouns are identified and categorized, they are preferentially ignored by the natural language processing application, as they provide little value for the purposes of generating a structured request that is sent to the response generation application 62. However, other embodiments may use pronouns in generating structured requests.

Verbs are words that express some form of action. In English grammar, verbs have three moods: the indicative, which expresses actuality; the subjunctive, which expresses contingency; and the imperative, which expresses command (I ran; I might run; Run!). Like nouns, the natural language processing application uses the identified verbs from the verbal requests 100-104 to determine the type of action that the user is requesting to undertake. For example, a verb in a verbal request 100-104 like "purchase" or "buy" will indicate to the response generation application that processes the request that the user is looking to buy a particular item. As such, the natural language processing application will generate structured requests that generate results based on the type of action being requested.

Referring to FIG. 4, each of the requests 100-104 illustrated in FIG. 3 has a particular grammar structure associated with the words contained in each respective request 100-104. While some requests will leverage the same word structure to convey a similar concept or request, other requests will leverage a different word structure to convey a similar concept or request. During operation, the preferred natural language processing application breaks up each request 100-104 into individual parts of speech where the most common words in each part are reused and only the words specific to the request have to be created in a grammar database.

Although not specifically illustrated, in some embodiments, the grammar database is used by the response generation application 62 to locate similar types of requests 100-104 that have been made by users of the remote terminals 12. The response generation application 62 can also keep track of prior structured responses that were made to similar requests 100-104. As such, the grammar database can be built up over time to include almost any type of request 100-104 for a particular product or service, thereby eliminating the need for the response generation application 62 to search the business data files 56 every time a request 100-104 is made. In this preferred embodiment, the grammar database is located in the data files 52. Those skilled in the art would recognize that the grammar database could be located in other locations as well.

As illustrated in FIG. 5, each of the requests 100-104 set forth in FIG. 3 generalizes into a predetermined set of grammars that are associated with each request 100-104. Referring to FIG. 6, during operation the words contained in each request 100-104 are broken down or generalized into sub-grammar categories with each word falling into a particular category based on its grammatical use in the request 100-104. Once the sub-grammar categories are created, the preferred natural language processing application uses these values to generate a structured request that is processed by the response generation application 62 (see FIG. 2).

In the embodiment being discussed, the response generation application 62 uses these values to search the grammar database for marches that contain words falling into the same grammar category. If an exact match is not made, the response generation application 62 searches the business data files 56 and generates a structured response that is presented to the user of the remote terminal 12 using one of several methods set forth above in relation to other embodiments of the present invention presentation. Once the response generation application 62 has retrieved the proper listing from the business data files 56, the response generation application 62 will update the grammar database if an exact match was not found so that future requests matching that criterion can generate responses with a higher degree of accuracy and speed.

Referring to FIG. 6, each of the requests 100-104 has been broken down into sub-grammar categories to illustrate how the preferred natural language processing application functions during normal operation. As illustrated, there are two words that are located in the "verb" category: "Do" and "have," while there are four implicitly identified words and five explicitly identified words found in the noun category: "specials," "DVD," "players," "discounts," "sale," "special," "player," "discount" and "sales". The preferred natural language processing application automatically associates plural forms of words with singular forms of words that are located in the "noun" sub-grammar category so that the search that is conducted for resulting matches will encompass a broader search thereby yielding more reliable results.

Referring once again to FIG. 1 in yet another preferred embodiment of the present invention, when a user of the remote terminal 12 generates a voice request 100-104, it is transmitted to the base station 16, which, in turn, transmits it to the speech recognition server 24. As previously set forth, the speech recognition server 24 uses speech recognition applications that are programmed to recognize or identify the words that are contained in the voice request 100-104. After the words contained in the voice request 100-104 have been identified, a grammar associated with each word is also identified by the natural language processing applications located on the natural language processing server 26. Once the grammars have been identified for each respective word, the natural language processing application categorizes each word into a respective grammar category.

After the words are categorized by the natural language processing application, a structured request is generated by the natural language processing application that is sent to location-based application server 28. The response generation application 62, which is preferentially located on the location-based application server 28, uses this structured request to locate the product or service being requested. The response generation application 62 uses the structured request as an input to a search engine that searches for matches to the products or services being requested in the business data file 56. Once a match is located by the response generation application 62, a structured response to the voice request is generated by the response generation application 62.

In one preferred embodiment of the present invention, the structured response is sent to the voice synthesis server 33, which transforms the structured response into a voice response that is sent to the remote terminal 12. As with other embodiments of the present invention, if multiple listings are located, the voice response can be generated in the form of a menu thereby allowing the user of the remote terminal 12 to interact with the listing of located items. The user of the remote terminal 12 can use an input device, such as a pointer or keypad, to interact with the listings, or the user may be provided to use his/her voice to interact with the listings in other embodiments. In yet another preferred embodiment of the present invention, the structured response is generated as a text message that is sent to the remote terminal 12. Preferentially, the text message is sent to the remote terminal 12 using a wireless application protocol. In yet other embodiments, the text message may also be accompanied by image files or sound files.

While the invention has been described in its currently best-known modes of operation and embodiments, other modes, embodiments and advantages of the present invention will be apparent to those skilled in the art and are contemplated herein.

What is claimed is:

1. A method of providing natural language processing in a communication system, comprising the steps of:
   receiving a non-predefined voice request for business information related to a product, and a geographic location;
   identifying a plurality of words contained in said non-predefined voice request for information with a speech recognition application;
   identifying a grammar associated with each said word, wherein said grammar is selected from a group of grammars consisting of a noun, an adjective, an adverb, a preposition, a conjunction, a pronoun, a verb, and an interjection;
   categorizing each said word into a respective grammar category;
   generating a structured request based on said geographic location and said categorization of said words which comprises ignoring each said word that is identified as a pronoun, limiting the structured request based on a meaning of at least one of said words that is identified as a noun, and restricting the structured request for each said word that is identified as a conjunction;
   searching a grammar database for a similar request that contains words in the same grammar category as said structured request;
   when said similar request is not found in said grammar database, searching a plurality of business data files for information to be used in a structured response, wherein said business data files include product and service related information of a plurality of different businesses;
   updating said grammar database to include said structured request and said structured response to avoid a future search of said business data files for a similar structured request; and
   generating said structured response to said non-predefined voice request for information with a response generation application.

2. The method of claim 1, further comprising the step of narrowing said structured response to a geographic area in which a remote terminal is located based on said received geographic location.

3. The method of claim 1, wherein said voice request contains a request for a particular product.

4. The method of claim 1, wherein said structured response is generated as a voice response.

5. The method of claim 1, wherein said structured response is generated as a text message.

6. The method of claim 1, further comprises the step of transmitting said structured response to a remote terminal.

7. The method of claim 1, wherein categorizing each said word into a respective grammar category comprises categorizing each said word into one of a plurality of grammar categories based on a grammatical use of each said word in said non-predefined voice request, the grammar categories being noun, adjective, adverb, preposition, conjunction, pronoun, verb, and interjection.

8. The method of claim 1, wherein searching comprises searching based on said structured request and said geographic location.

9. The method of claim 1, wherein receiving said non-predefined voice request for business information related to a product comprises receiving said geographic location at about the same time as said non-predefined voice request for business information is received.

10. The method of claim 1, wherein receiving said non-predefined voice request for business information related to a product comprises receiving said geographic location prior to receipt of said non-predefined voice request for business information.

11. A wireless communication system with natural language processing, comprising:

a speech recognition application configured to receive a non-predefined voice request for information from a remote terminal, wherein said speech recognition application is operable to identify a plurality of words contained in said non-predefined voice request for information;

a natural language processing application connected to said speech recognition application, wherein said natural language processing application is operable to generate a structured request based on said words contained in said non-predefined voice request for information and a geographic location of said remote terminal;

wherein said natural language processing application is operable to categorize said words contained in said non-predefined voice request for information into a respective one of a plurality of grammar categories;

wherein said words in said grammar categories and said geographic location are useable by a response generation application connected to said natural language processing application to locate in a grammar database a product identified in said non-predefined voice request for information;

wherein said response generation application is further operable to retrieve said product identified in said non-predefined voice request for information, based on said geographic location, from a plurality of business data files when said product is not locatable in said grammar database; and wherein said response generation application is further operable to update said grammar database with said retrieved product, and generate a structured response to said structured request.

12. The wireless communication system of claim 11, further comprising a voice synthesis application connected to said response generation application for transforming said structured response into a voice response.

13. The wireless communication system of claim 11, wherein said non-predefined voice request for information contains a request for a particular product.

14. The wireless communication system of claim 11, wherein said structured response is generated as a text message that is sent to said remote terminal.

15. The wireless communication system of claim 11, wherein said geographic location is generatable with said remote terminal.

16. The wireless communication system of claim 15, wherein said geographic location is pre-settable with said remote terminal to a desired geographic location.

17. The wireless communication system of claim 11, wherein said geographic location is generatable with a base station in communication with said remote terminal.

18. The wireless communication system of claim 11, wherein said response generation application is operable to search said grammar database for the same words in the same grammar categories to locate said product in said grammar database.

19. A method of providing natural language processing in a location-based services system, comprising the steps of:

receiving a non-predefined voice request for information from a remote terminal, and a geographic location of said remote terminal;

identifying a plurality of words contained in said non-predefined voice request for information with a speech recognition application;

identifying a grammar associated with each said word;

categorizing each said word into a respective grammar category based on grammatical use;

generating a structured request based on said categorization of said words;

searching for matches to each said categorized word in said structured request in a grammar database with a response generation application, said grammar database organized based on parts of speech into a plurality of grammar categories each containing a plurality of words that are searchable for matches to each said categorized word that are in said respective grammar category;

searching for matches to each said categorized word in a database of products with said response generation application only when there are no matches found in said grammar database, said database of products containing business data files businesses listed within said location-based services system;

generating a structured response to said non-predefined voice request for information with said response generation application, wherein said structured response is geographically targeted based on said geographic location of said remote terminal; and in response to matches to each said categorized word in said database of products, updating said grammar database to include said structure request and said structured response to avoid a future search in said database of products for a similar structured request.

20. The method of claim 19, wherein said non-predefined voice request for information contains a request for a particular product.

21. The method of claim 19, wherein the grammar is selected from a group of grammars consisting of a noun, an adjective, an adverb, a preposition, a conjunction, a pronoun, a verb and an interjection.

22. The method of claim 19, wherein said structured response is generated as a voice response.

23. The method of claim 19, wherein said structured response is generated as a text message.

24. The method of claim 17 further comprises the step of transmitting said structured response to said remote terminal.

25. The method of claim 19, wherein categorizing each said word into a respective grammar category comprises categorizing each said word into one of a plurality of grammar categories based on a grammatical use of each said word in said non-predefined voice request, the grammmar categories being noun, adjective, adverb, preposition, conjunction, pronoun, verb, and interjection.

26. The method of claim 19, wherein receiving said non-predefined voice request comprises receiving said geographic location at about the same time as said non-predefined voice request for information.

27. The method of claim 19, wherein receiving said non-predefined voice request comprises receiving said geographic location prior to receipt of said non-predefined voice request.

* * * * *

UNITED STATES PATENT AND TRADEMARK OFFICE
CERTIFICATE OF CORRECTION

PATENT NO. : 7,437,295 B2  Page 1 of 1
APPLICATION NO. : 10/131898
DATED : October 14, 2008
INVENTOR(S) : Ashton F. Pitts, III, Stephen L. Dempsen and Vinny Wai-yan Che It is certified that error appears in the above-identified patent and that said Letters Patent is hereby corrected as shown below:

Column 3, line 4, change "trough" to --through--

Column 9, line 36, change "capability" to --capability.--

Column 14, line 11, change "request" to --request,--

Column 14, line 22, change "09/946.111" to --09/946,111--

Column 17, line 10, change "marches" to --matches--

Signed and Sealed this

Sixteenth Day of December, 2008

JON W. DUDAS
*Director of the United States Patent and Trademark Office*